US012570074B2

(12) United States Patent (10) Patent No.: US 12,570,074 B2
Morita et al. (45) Date of Patent: Mar. 10, 2026

(54) METHOD FOR PRODUCING LAMINATED GLASS FOR AUTOMOBILE WINDOWS

(71) Applicant: AGC Inc., Tokyo (JP)

(72) Inventors: Yoshinobu Morita, Tokyo (JP);
Yoshiaki Ohba, Tokyo (JP)

(73) Assignee: AGC INC., Tokyo (JP)

( * ) Notice: Subject to any disclaimer, the term of this patent is extended or adjusted under 35 U.S.C. 154(b) by 86 days.

(21) Appl. No.: 18/381,424

(22) Filed: Oct. 18, 2023

(65) Prior Publication Data

US 2024/0042737 A1 Feb. 8, 2024

Related U.S. Application Data

(63) Continuation of application No. PCT/JP2022/017961, filed on Apr. 15, 2022.

(30) Foreign Application Priority Data

Apr. 20, 2021 (JP) ................................. 2021-071145

(51) Int. Cl.
B32B 17/10 (2006.01)
B24C 1/04 (2006.01)
(Continued)

(52) U.S. Cl.
CPC .......... B32B 17/10146 (2013.01); B24C 1/04 (2013.01); B32B 17/10036 (2013.01); B32B 17/10862 (2013.01); B32B 17/10889 (2013.01); B32B 17/10935 (2013.01); B32B 17/10981 (2013.01); B32B 38/162 (2013.01);

C03B 23/023 (2013.01); C03C 19/00 (2013.01); C03C 23/0075 (2013.01); B32B 2250/03 (2013.01);
(Continued)

(58) Field of Classification Search
CPC ........ B32B 17/10036; B32B 17/10862; B32B 17/10146; C03C 19/00; B24C 1/06
See application file for complete search history.

(56) References Cited

U.S. PATENT DOCUMENTS 3,351,001 A * 11/1967 Achkio ............. B32B 17/10862
65/370.1
3,801,423 A * 4/1974 Van Laethem ... B32B 17/10981
428/161
(Continued)

FOREIGN PATENT DOCUMENTS

GB 1 359 166 A 7/1974
JP H11-60292 A 3/1999
(Continued)

OTHER PUBLICATIONS

International Searching Authority, "International Search Report," issued in connection with International Patent Application No. PCT/JP2022/017961, dated Jun. 21, 2022.
(Continued)

*Primary Examiner* — Scott W Dodds
(74) *Attorney, Agent, or Firm* — Foley & Lardner LLP

(57) ABSTRACT
A method for producing laminated glass for automobile windows includes heating and bend forming two glass plates; and bonding together the two bend-formed glass plates via an interlayer film, wherein, the method further includes scratching that is performed on a concave surface of at least one of the two glass plates, after the bend-forming.

9 Claims, 8 Drawing Sheets

(51) Int. Cl.
　　B32B 38/16　　　　(2006.01)
　　C03B 23/023 　　　(2006.01)
　　C03C 19/00 　　　(2006.01)
　　C03C 23/00 　　　(2006.01)
　　B60J 1/00 　　　　(2006.01)

(52) U.S. Cl.
　　CPC ....... *B32B 2250/40* (2013.01); *B32B 2605/08*
　　　　　　(2013.01); *B60J 1/001* (2013.01)

(56) References Cited

U.S. PATENT DOCUMENTS

| | | | | |
|---|---|---|---|---|
| 5,499,912 | A | * | 3/1996 | Mezei .................... B24B 19/226 |
| | | | | 425/363 |
| 6,025,025 | A | * | 2/2000 | Bartrug .................... C09K 3/18 |
| | | | | 427/302 |
| 6,416,390 | B1 | * | 7/2002 | Mezei .................... G02B 6/001 |
| | | | | 451/75 |

| | | | | |
|---|---|---|---|---|
| 2015/0132538 | A1 | * | 5/2015 | Cleary ............. B32B 17/10137 |
| | | | | 428/141 |

FOREIGN PATENT DOCUMENTS

| | | | |
|---|---|---|---|
| JP | 2016-036751 | A | 3/2016 |
| JP | 2017-213928 | A | 12/2017 |
| JP | 6065221 | B2 | 3/2018 |
| JP | 6287672 | B2 | 3/2018 |
| WO | WO-2019/245819 | A1 | 12/2019 |
| WO | WO-2021/180954 | A1 | 9/2021 |
| WO | WO-2023/041915 | A1 | 3/2023 |

OTHER PUBLICATIONS

International Searching Authority, "Written Opinion," issued in connection with International Patent Application No. PCT/JP2022/017961, dated Jun. 21, 2022.

\* cited by examiner

<FIRST EMBODIMENT>

PREPARE TWO FLAT GLASS PLATES ——S10

BEND FORMING ——S20

STACK TWO GLASS PLATES ——S21

PERFORM BEND FORMING ——S22

CLEANSING ——S30

SEPARATE TWO GLASS PLATES ——S31

PERFORM SCRATCHING ——Sc

CLEANSE WITH CLEANSING LIQUID ——S32

DRY ——S33

BONDING ——S40

LAMINATE TWO GLASS PLATES VIA INTERLAYER FILM ——S41

PERFORM PRELIMINARY PRESSURE BONDING ——S42

PERFORM MAIN PRESSURE BONDING ——S43

FIG.5

<SECOND EMBODIMENT>

PREPARE TWO FLAT GLASS PLATES — S10

BEND FORMING — S20

STACK TWO GLASS PLATES — S21

PERFORM BEND FORMING — S22

CLEANSING — S30

SEPARATE TWO GLASS PLATES — S31

S32+Sc

CLEANSE WITH CLEANSING LIQUID AND PERFORM SCRATCHING

DRY — S33

BONDING — S40

LAMINATE TWO GLASS PLATES VIA INTERLAYER FILM — S41

PERFORM PRELIMINARY PRESSURE BONDING — S42

PERFORM MAIN PRESSURE BONDING — S43

<THIRD EMBODIMENT>

PREPARE TWO FLAT GLASS PLATES — S10

BEND FORMING — S20

STACK TWO GLASS PLATES — S21

PERFORM BEND FORMING — S22

CLEANSING — S30

SEPARATE TWO GLASS PLATES — S31

CLEANSE WITH CLEANSING LIQUID — S32

DRY — S33

BONDING — S40

LAMINATE TWO GLASS PLATES VIA INTERLAYER FILM — S41

PERFORM PRELIMINARY PRESSURE BONDING AND PERFORM SCRATCHING — S42+Sc

PERFORM MAIN PRESSURE BONDING — S43

METHOD FOR PRODUCING LAMINATED GLASS FOR AUTOMOBILE WINDOWS

CROSS-REFERENCE TO RELATED APPLICATION

The present application is a continuation application of International Application No. PCT/JP2022/017961, filed Apr. 15, 2022, which claims priority to Japanese Patent Application No. 2021-071145 filed Apr. 20, 2021. The contents of these applications are incorporated herein by reference in their entirety.

BACKGROUND OF THE INVENTION

1. Field of the Invention

The disclosures herein relate to a method for producing laminated glass for automobile windows.

2. Description of the Related Art

There is demand for an automobile to have safety performance not only from the standpoint of occupant protection but also from the standpoint of the bodily protection of a pedestrian at the time of collision with the pedestrian. In response to such a demand, for example, Unexamined Japanese Patent Application Publication No. 2017-213928 proposes a configuration in which when a downward impact is applied from the front to the surroundings of a cowl louver and a windshield glass in a case where a pedestrian is involved in a head-on collision with an automobile, the connected cowl louver and windshield glass become separated from each other, thereby ensuring bodily protection performance for the pedestrian.

According to recent accident research, it has been reported that when a rider (i.e., a cyclist) of a bicycle, a two-wheeled vehicle, or the like has a frontal collision with a vehicle, the position at which the body of the cyclist collides with the vehicle is higher than that of a pedestrian, that is, the position tends to be mainly the windshield (i.e., front glass). Further, even in the case of a pedestrian, the frequency at which the body of the pedestrian collides with the windshield is on the rise due to the structure of a recent automobiles having a short front nose. Therefore, there is demand for the window glass itself such as a windshield to have improved bodily protection performance for pedestrians and cyclists (Hereinafter, also referred to as pedestrians and the like) alike. Here, in order to improve the bodily protection performance of the laminated glass for automobile windows (Hereinafter, also referred to as automobile window laminated glass) such as a windshield with respect to pedestrians and the like, it is important to reduce the impact and damage to the body of a pedestrian or the like by having the glass plate break appropriately at the time of the collision, thereby enabling the glass plate itself to absorb the impact, and, in turn, further enabling an interlayer film interposed between the glass plates to also fulfill its functions with respect to impact absorption and penetration prevention.

It is known, however, that a glass plate originally has an in-plane strength distribution, and the strength of the glass plate is typically probabilistically specified by a safety factor, a breakage probability, or the like. As such, even in a case where the overall strength of the window glass is appropriate, a region with an excessively high strength (Hereinafter, also referred to as a high-strength region) may be localized in the plane of the window glass. When a pedestrian or the like collides with such a high-strength region, the window glass is unlikely to break. Consequently the window glass cannot absorb the impact and the inter-layer film cannot fulfill its function, and thus the possibility of bodily damage being inflicted increases.

In order to lower the strength in the high-strength region as described above, it is conceivable to lower the overall strength of the glass for automobile windows by changing the composition of the glass or the production method thereof. However, in such a case, since the strength would decrease even in a region where the in-plane strength is relatively low, there is a possibility that the requisite toughness as automobile window glass cannot be ensured. Therefore, there is a demand for automobile window glass having high safety performance at the time of collision from the standpoint of protecting the body of, for example, a pedestrian as described above by reducing or eliminating a region having excessively high strength to make the in-plane strength distribution as uniform as possible.

An object of one aspect of the present disclosure is to provide laminated glass for automobile windows that has the requisite toughness as automobile window glass and has high bodily protection performance for pedestrians or the like in the event of collision.

SUMMARY OF THE INVENTION

According to one aspect of the present disclosure a method for producing laminated glass for automobile windows includes heating and bend forming two glass plates; and bonding together the two bend-formed glass plates via an interlayer film, wherein, the method further includes scratching that is performed on a concave surface of at least one of the two glass plates, after the bend-forming.

According to one aspect of the present disclosure, automobile window laminated glass having the requisite toughness as automobile window glass and having high bodily protection performance for a pedestrian or the like at the time of collision can be obtained.

BRIEF DESCRIPTION OF THE DRAWINGS

FIG. 5 is a cross-sectional view, taken along a conveyance direction of glass plate, of a glass plate in a state where a rotary brush is in contact with the bent glass plate;

DESCRIPTION OF THE PREFERRED EMBODIMENT

<Basic Structure of Laminated Glass>

Figure 1:
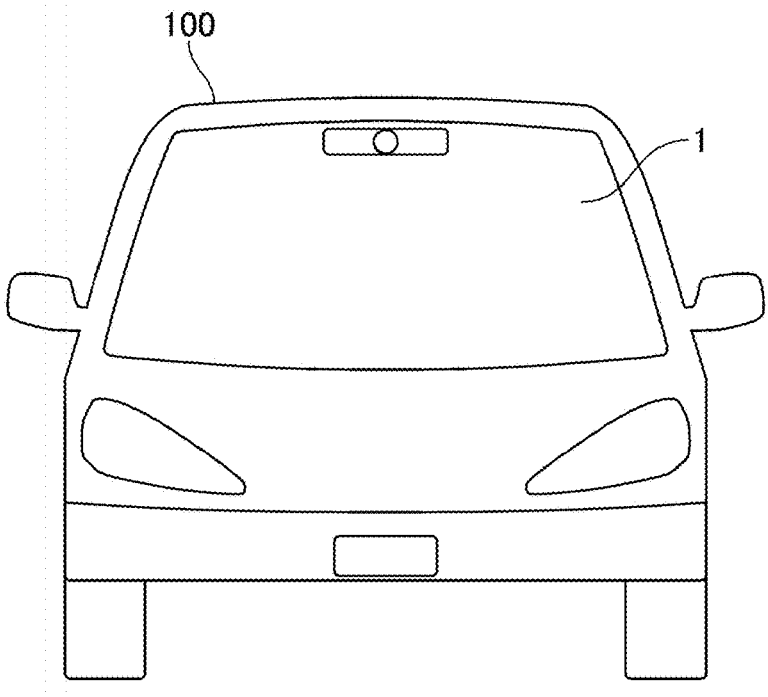
FIG. 1 is a front view of an automobile provided with laminated glass according to an embodiment of the present disclosure.

Laminated glass for automobile windows 1 (Hereinafter, also referred to as automobile window laminated glass 1) produced according to an embodiment of the present disclosure is used as window glass of an automobile. FIG. 1 illustrates an automobile 100 equipped with a the automobile window laminated glass 1. In this example, although the automobile window laminated glass 1 is glass attached to an opening (window) in a front surface, i.e., windshield, of a vehicle body, the automobile window laminated glass 1 according to the present embodiment can also be used as window glass other than the windshield, examples of which include, side glass, rear glass, and roof glass.

Figure 2:
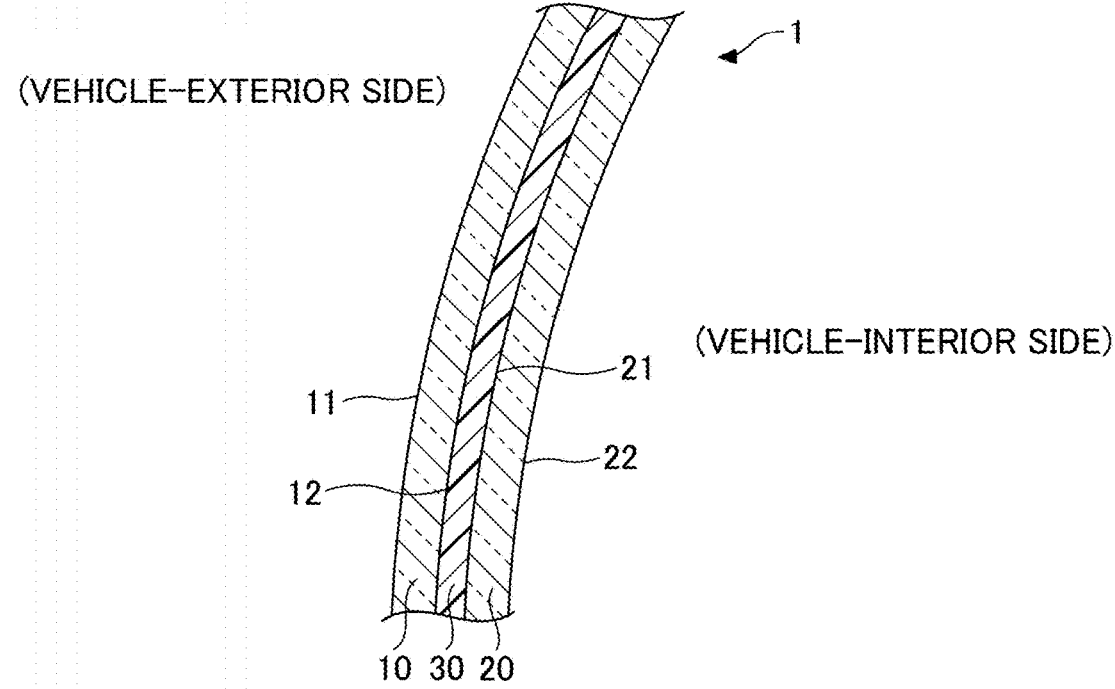
FIG. 2 is a cross-sectional view of the laminated glass illustrated in FIG. 1.

FIG. 2 illustrates a partial cross-sectional view of the automobile window laminated glass 1 illustrated in FIG. 1. As illustrated in FIG. 2, the automobile window laminated glass 1 may be obtained by bonding together a vehicle-exterior side glass plate 10 and a vehicle-interior side glass plate 20 via an interlayer film 30. As illustrated in FIG. 2, the vehicle-exterior side glass plate 10 has a first surface 11 that is a surface on the vehicle-exterior side and a second surface 12 that is a surface on the vehicle-interior side, and the vehicle-interior side glass plate 20 has a third surface 21 that is a surface on the vehicle-exterior side and a fourth surface 22 that is a surface on the vehicle-interior side.

The material constituting the vehicle-exterior side glass plate 10 and the vehicle-interior side glass plate 20 (Hereinafter, also collectively referred to as a glass plate for the sake of simplicity) in the laminated glass 1 is preferably inorganic glass. Examples of the inorganic glass include soda lime silicate glass, aluminosilicate glass, borate glass, lithium aluminosilicate glass, and borosilicate glass. Although the method for forming the glass plate made of inorganic glass is not particularly limited, the glass plate is preferably formed by, for example, a float method. Further, the glass plate may be non-tempered glass (float glass). The non-tempered glass is glass obtained by shaping molten glass into a plate shape and annealing the glass, yet is not subjected to tempering treatment such as air-cooling tempering treatment or chemical tempering treatment. By using the non-tempered glass, even in a case where the glass gets broken when an impact is sustained, the entire surface does not get finely crushed, and thus the field of view of an occupant can be ensured even in the event of an accident.

The thicknesses of the vehicle-exterior side glass plate 10 and the vehicle-interior side glass plate 20 may be the same or different from each other. The thickness of the vehicle-exterior side glass plate 10 may be 1.1 mm or more and 3.5 mm or less. The thickness of the vehicle-interior side glass plate 20 may be 0.5 mm or more and 2.3 mm or less. Further, the total thickness of the automobile window laminated glass 1 may be 2.3 mm or more and 8.0 mm or less. The configurations of the vehicle-exterior side glass plate 10 and the vehicle-interior side glass plate 20 (materials constituting the glass plates, methods of producing the glass plates, and the like) may also be the same or different from each other.

The material of the interlayer film 30 that is disposed between the vehicle-exterior side glass plate 10 and the vehicle-interior side glass plate 20 and bonds together the vehicle-exterior side glass plate 10 and the vehicle-interior side glass plate 20 is not particularly limited, but is preferably a thermoplastic resin. Examples of the material of the interlayer film 30 include thermoplastic resins conventionally used for the same purpose, such as plasticized polyvinyl acetal resins, plasticized polyvinyl chloride resins, saturated polyester resins, plasticized saturated polyester resins, polyurethane resins, plasticized polyurethane resins, ethylene-vinyl acetate copolymer resins, ethylene-ethyl acrylate copolymer resins, cycloolefin polymer resins, and ionomer resins. Further, resin compositions containing a modified hydrogenated block copolymer described in Japanese Patent No. 6065221 can also be suitably used. Among them, plasticized polyvinyl acetal resins are considered to be a suitable material because they have an excellent balance of various characteristics such as transparency, weather resistance, strength, adhesiveness, penetration resistance, impact energy absorption, moisture resistance, heat insulation, and sound insulation. The above thermoplastic resins may be used alone or two or more of these thermoplastic resins may be used in combination. "Plasticized" in the plasticized polyvinyl acetal resin means that the resin is plasticized by the addition of a plasticizer. The same applies to other plasticized resins.

The interlayer film 30 may be a resin not containing a plasticizer, for example, an ethylene-vinyl acetate copolymer resin. Examples of the above-described polyvinyl acetal resin include a polyvinyl formal resin obtained by reacting polyvinyl alcohol (PVA) with formaldehyde, a narrowly defined polyvinyl acetal resin obtained by reacting PVA with acetaldehyde, and a polyvinyl butyral resin (PVB) obtained by reacting PVA with n-butyraldehyde. In particular, PVB is considered to be a suitable material because it has an excellent balance of various characteristics such as transparency, weather resistance, strength, adhesiveness, penetration resistance, impact energy absorption, moisture resistance, heat insulation, and sound insulation. The above-mentioned resins may be used alone or two or more of these resins may be used in combination.

A peripheral edge of the automobile window laminated glass 1 may be provided with a shielding layer for protecting a sealant or the like that bonds and holds the automobile window laminated glass 1 to a vehicle body. The shielding layer can be formed by, for example, applying a ceramic color paste of a low-lightness color such as black, gray, or brown color containing a meltable glass frit containing a black pigment and firing the ceramic color paste. The shielding layer may be formed on the peripheral edge of the second surface 12, the third surface 21, the fourth surface 22 (FIG. 2), or any combination thereof of the automobile window laminated glass 1, preferably on the peripheral edge of one or both of the second surface 12 and the fourth surface 22. The shielding layer may be provided in an area from the peripheral edge end of the glass plate to a position 10 mm or more and 300 mm or less from the peripheral edge end of the glass plate.

As illustrated in FIG. 2, the automobile window laminated glass 1 may be entirely or partially curved so as to be convex on the vehicle-exterior side. In such a case, each of the vehicle-exterior side glass plate 10 and the vehicle-interior side glass plate 20 can be processed and curved to a desired predetermined curvature in one direction or two directions by a bend-forming step described further below.

<Method for Producing Laminated Glass for Automobile Windows>

The method for producing the laminated glass for automobile windows according to the embodiment of the present disclosure may be broadly divided into a flat plates preparation step in which two flat glass plates cut into a desired outer shape are prepared, a bend-forming step in which the two flat glass plates are heated and bend formed, a cleansing step in which the two bent glass plates are cleansed, and a bonding step in which the two bent glass plates are bonded together via an interlayer film. Further, after the aforementioned bend-forming step in the present embodiment, a concave surface of at least one glass plate of the two glass plates is scratched. In the present specification, "scratching" is a process of forming minute cracks (also referred to as microcracks, invisible minute cracks on the order of micrometers or less) on the surface of a glass plate.

Conventionally, there has been demand for laminated glass for automobile windows to have various properties and functions related to safety, and the demand for such properties and functions is on the rise. In particular, nowadays, importance is being placed on not only the standpoint of occupant protection but also on the standpoint of bodily protection of a pedestrian or the like (a pedestrian, a cyclist, or the like) in a case where there is a collision with the pedestrian. Laminated glass for automobile windows is also required to satisfy specific standards such as the Head Injury Criterion (HIC) on the assumption that the laminated glass has appropriate toughness as an automobile window glass. For example, an HIC value of less than 1,000, preferably less than 650, may be required in a predetermined region of the laminated glass for automobile windows. Here, in order to improve the performance of protecting the body of a pedestrian or the like at the time of collision, it is important that a region where the strength is excessively high (high strength region) is reduced or eliminated in the laminated glass for automobile windows, and the distribution of the strength over the surface direction is suppressed (the strength distribution is narrow), that is, the in-plane strength is made uniform or equal as much as possible.

In the present embodiment, the strength of the glass plate and the strength of the laminated glass obtained using the glass plate can be made uniform or equal in the plane direction by scratching the surface of the glass plate. Originally, minute cracks are present on the surface of the glass plate after production, and uneven distribution of the minute cracks is said to be a factor of the variation in strength of the glass for automobile windows. However, according to the production method of the present embodiment, it is considered that the strength of a region having excessively high strength (high-strength region) can be reduced by introducing additional minute cracks on the surface of the glass plate by performing scratching. Further, the scratching in the present embodiment is a process by which the strength of the region where the strength is relatively low is not further reduced or is hardly reduced. Therefore, according to the present embodiment, by performing the scratching, the in-plane strength of the glass plate or the obtained laminated glass can be made uniform, while still maintaining the requisite strength of the glass for automobile windows. As a result, automobile window laminated glass having a property that ensures the safety of a pedestrian or the like even in a case where the pedestrian or the like collides with the laminated glass, and also having the requisite toughness as glass for automobile windows, can be provided.

Further, with the production process according to the present embodiment, the aforementioned scratching is performed after the bending-forming step as described above. Since the bend-forming step takes place when the glass plate is close to the softening point or when the glass plate is at the softening point or higher than the softening point, in a case where scratching is performed before the bend-forming step, the shape of the minute cracks formed on the surface of the glass plate get altered by the heat, and this consequently may diminish the advantageous effects of the cracks that were introduced. With the production method of the present embodiment, however, in which the scratching is performed after the bend-forming step, the shape of the cracks that were introduced do not get altered by any heat, and thus the advantageous effects of the cracks that were introduced can be sufficiently maintained.

Furthermore, the scratching is performed on a surface, situated on the vehicle-interior side upon the attaching of the laminated glass to the automobile, of at least one of the two flat glass plates. In a case where a pedestrian or the like collides with the windshield of the automobile from the vehicle-exterior side, the impact of the collision is sequentially transmitted from the first surface 11 of the vehicle-exterior side glass plate which is the outermost surface to the fourth surface 22 of the vehicle-interior side glass plate which is the innermost surface (FIG. 2). At this timing, in the vehicle-exterior side glass plate 10, a compressive stress corresponding to the compressive force at which an area is compressed is generated in the first surface 11, and a tensile stress corresponding to the tensile force at which an area is expanded is generated in the second surface 12. Therefore, in the vehicle-exterior side glass plate 10, a crack is likely to start from the second surface 12 on the vehicle-interior side. Therefore, it is preferable that the second surface 12 readily breaks as intended at the time of collision. That is, it is preferable that there is no high-strength region or that there is only a small high-strength region, where the strength is locally excessively high in the second surface 12. Likewise, focusing on the vehicle-interior side glass plate 20, a compressive stress corresponding to a compressive force at which an area is compressed is generated in the third surface 21, and a tensile stress corresponding to a tensile force at which an area is expanded is generated in the fourth surface 22. Therefore, in the vehicle-interior side glass plate 20, cracking is likely to start from the fourth surface 22 on the vehicle-interior side. Therefore, it is preferable that the fourth surface 22 readily breaks as intended at the time of collision. That is, it is preferable that there is no high-strength region or that there is only a small high-strength region, where the strength is locally excessively high in the fourth surface 22. Therefore, in the present embodiment, at least one of the second surface 12 on the vehicle-interior side of the vehicle-exterior side glass plate 10 or the fourth surface 22 on the vehicle-interior side of the vehicle-interior side glass plate 20 is subjected to a scratching process from the standpoint of protecting the body of a pedestrian or the like at the time of collision with the pedestrian. Further, if one of the second surface 12 and the fourth surface 22 is used, it is more preferable to apply the scratching process to the second surface 12 as this surface is more greatly affected by the impact at the time of collision, yet it is even more preferable to apply the scratching process to both the second surface 12 and the fourth surface 22.

The second surface 12 and the fourth surface 22 that are situated on the vehicle-interior side upon the attaching of the laminated glass to the body of the automobile serve as the concave surfaces, particularly in the case where the laminated glass is a windshield, as illustrated in FIG. 2. Therefore, in the present embodiment, by scratching the concave surface of a glass plate of at least one of the two bend-formed glass plates, laminated glass in which at least one of the second surface 12 or the fourth surface 22 underwent scratching process can be obtained.

Production Method According to the First
Embodiment

Figure 3:
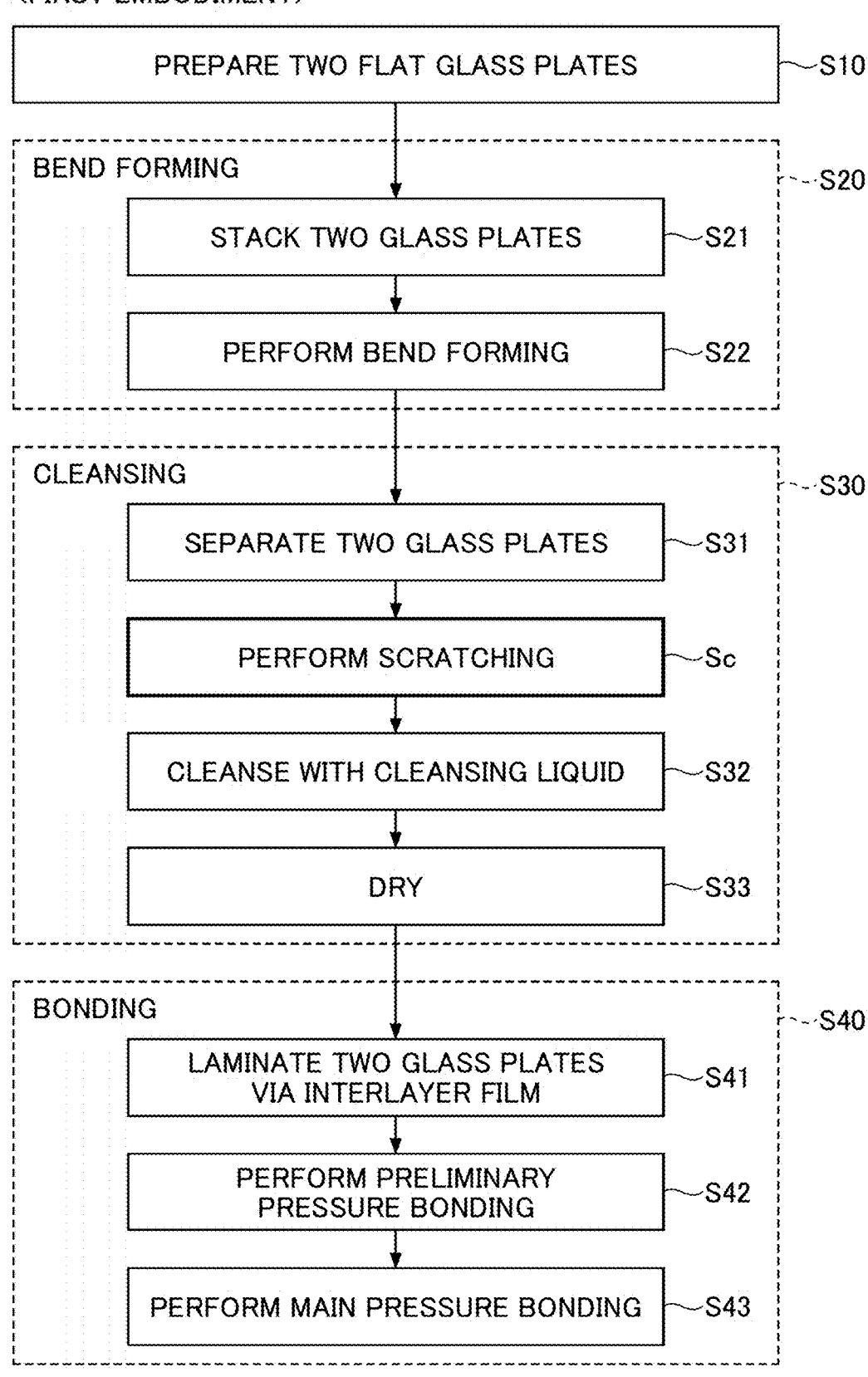
FIG. 3 is a flowchart illustrating an example of a method for producing laminated glass according to a first embodiment of the present disclosure.

FIG. 3 is a flowchart illustrating an example of a method for producing laminated glass for automobile windows according to the first embodiment. As illustrated in FIG. 3, this production method is broadly divided into a flat glass plates preparing step (S10), a bend-forming step (S20), a cleansing step (S30), and a bonding step (S40).

The aforementioned flat glass plates preparing step (S10) may include the producing of a long ribbon-shaped glass plate by a float method, a roll-out method, or the like, the annealing of the ribbon-shaped glass plate, the cutting out of a raw plate from the ribbon-shaped glass plate, the cutting of the raw plate into a desired outer shape such as the outer shape of a windshield, the chamfering, and the printing of a shielding layer. The order of these steps may be partially changed. Also, a portion of the step may be omitted and additional steps may be added.

The flat glass plates obtained in the flat glass plates preparing step (S10) are provided to the bend-forming step (S20). The bend-forming step (S20) is a step in which the flat glass plates are curved by heating the flat glass plates until they are close to the softening point or until the glass plates are at or higher than the softening point. The temperature at which glass is heated at the time of bend forming (S22) may be 550° C. or more and 700° C. or less. The bending-forming method is not particularly limited, and may be gravity bend forming in which the flat glass plate is placed on a ring mold and the glass plate is bent by its own weight in a heating furnace, press bend forming in which the glass plate is sandwiched and pressed between a ring mold (lower mold) and a press mold (upper mold), or a combination thereof. In the first embodiment, although the bend-forming step (S20) includes the stacking of the two flat glass plates that are to serve as the laminated glass (S21) and the performing of the bend forming (S22), the two flat glass plates that ultimately will serve as the laminated glass may each be individually bend formed. In such a case, the step (S21) in which the two flat glass plates are stacked is not necessary.

The bend forming (S22) may be single bending formation in which a flat glass plate is bent only in one direction, for example, only in the left-right direction or the up-down direction of an automobile upon the glass plate being attached to an opening of the automobile, or may be double bending formation in which the glass plate is bent in both the left-right direction and the up-down direction upon the glass plate being attached to an opening of the automobile. The radius of curvature of the glass plate obtained by the bend-forming step (S22) is preferably 200 mm or more and 300,000 mm or less, and more preferably 200 mm or more and mm or less. The radius of curvature of the vehicle-exterior side glass plate 10 and the vehicle-interior side glass plate 20 in the automobile window laminated glass 1 may be the same or different from each other.

The cleansing step (S30) can be performed on the bent glass plate after the bend forming (S22). Further, in the first embodiment, the scratching (Sc) in the cleansing step (S30) is performed. More specifically, the cleansing step (S30), includes the separating (S31) of the two flat glass plates that were stacked in the bend-forming step (S20), the performing of the scratch processing (Sc), the cleansing with a cleansing liquid (S32), and the drying (S33). Preferably, the two glass plates are annealed before the two glass plates are separated (S31).

The scratching (Sc) in the present embodiment can be performed by using a scratching tool (a scratching unit). In such a case, scratching is performed by bringing the scratching tool into contact with a surface of the glass plate and moving the scratching tool relatively to the surface of the glass plate. Furthering, in this present embodiment, this scratching can be performed before the cleansing (S32) in which the cleansing liquid is used, or can be performed as the cleansing step. By performing the cleansing (S32) in which the cleansing liquid is used, glass powder not visible to the human eye generated by the scratching can be removed by the cleansing (S32), and this is preferable.

Although the scratching tool that is to be used is not particularly limited, one that is equipped with a scratching element on the peripheral surface of the shaft body thereof and is capable of moving or rotating the shaft body relatively to the glass plate, thereby bringing the scratching element into contact with a surface of the glass plate and causing relative motion with respect to the surface of the glass plate is preferable. The scratching element may be a fiber or a bundle of fibers. Alternatively, the scratching element may be a film or a sheet. The scratching tool may be a scratching tool (rotary brush or the like) implanted with fibers, on the rotatable shaft body, that extend in radially, as viewed in a cross section the scratching tool. Alternatively, the scratching tool may be a scratching tool (rotary flap) in which one or multiple sheet-shaped flaps are joined with the peripheral surface of the rotatable shaft body. Alternatively, a sheet-shaped flap may be joined with a supporting body that has no rotational motion and an end portion of the sheet-shaped flap (non-rotating flap) may be configured to rub against the glass plate. Preferably, the aforementioned fiber or sheet serving as the scratching element is flexible. Furthermore, as another example, the scratching tool may be in the form of a film, sheet, disk, or the like that is placed such that the surface thereof faces the surface of the glass plate and is moved in the surface direction to rub against the surface of the glass plate.

Figure 4:
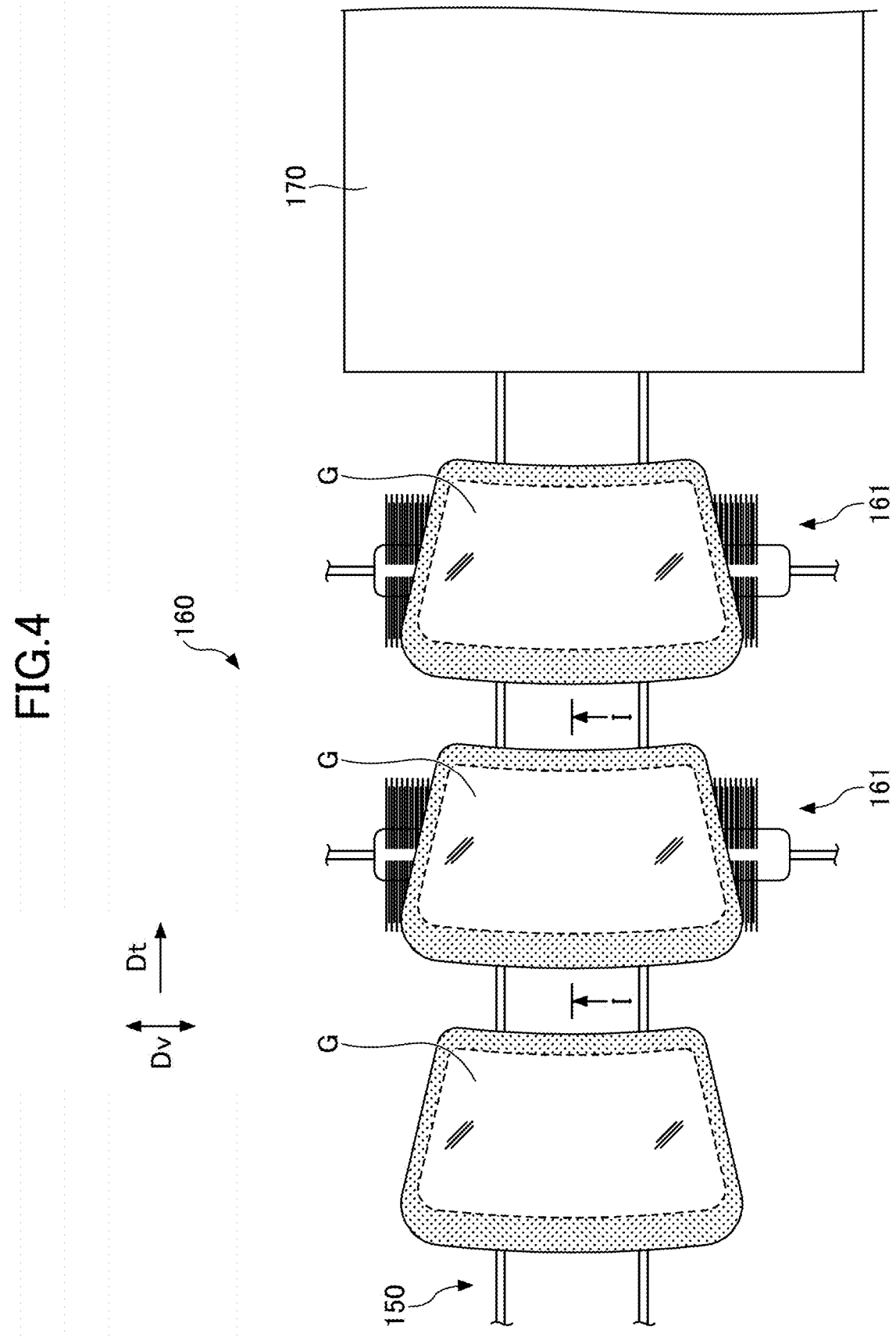
FIG. 4 is a diagram for describing scratching in the first embodiment.

FIG. 4 schematically illustrates scratching by a scratching unit 160 including one or more rotary brushes 161, as a scratching tool. FIG. 4 is a diagram of the scratching (Sc) before the cleansing (S32) in which cleansing liquid is used, as viewed from above the equipment (as viewed in the vertical direction). As illustrated in FIG. 4, the bend-formed glass plates (bent glass plates) G, G, and . . . are conveyed one at a time in the conveyance direction Dt. In the example illustrated in FIG. 4, the conveying unit 150 is a conveyor that includes two conveyor belts that extend in the conveyance direction Dt of the glass plates G and move in the conveyance direction Dt. In the example illustrated in FIG. 4, although the rotary brush 161 is disposed in the perpendicular direction Dv that is perpendicular to the conveyance direction Dt, the arrangement of the rotary brush 161 is not limited to this example. For example, the rotary brush 161 may be disposed such that the axial direction thereof is in the conveyance direction Dt or is diagonal to the conveyance direction Dt.

Figure 5:
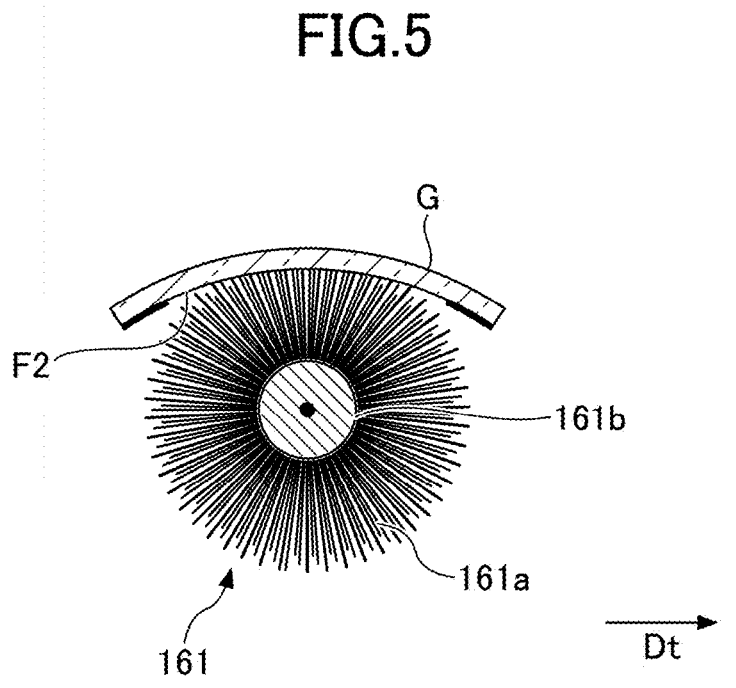

FIG. 5 is a cross-sectional view taken along the conveyance direction Dt (cross sectional view taken along I-I line in FIG. 4) of a bent glass plate G in a state where a rotary brush is in contact with the bent glass plate G. As illustrated in FIG. 5, the rotary brush 161 is implanted with brush fibers 161*a*, on a shaft body 161*b*, that extend radially from a peripheral surface of the rotary brush 161. The material of the fibers of the rotary brush 161 may be natural fibers (hair of an animal) or synthetic fibers (resin or the like). In the case where the fibers of the brush are composed of resins or include resins, specific examples of the resins include ultra-low density polyethylene, linear low-density polyethylene, low-density polyethylene, high-density polyethylene, poly-propylene, polystyrene, polyurethane, silicone resin, ethylene vinyl acetate (EVA), and olefinic elastomer.

The rotary brush 161 is configured and disposed such that at least the tip of the implanted brush fibers 161a come in contact with a concave surface F2 of bent glass plate G to is to scratched. The concave surface F2 of the glass plate G is the surface serving as the second surface 12 of the vehicle-exterior side glass plate 10 or the fourth surface 22 of the vehicle-interior side glass plate 20 (FIG. 2) in the obtained laminated glass. The rotary brush 161 may have the same diameter along the entirety of the rotary brush 161 in the axial direction, or may have a diameter that varies depending on the position in the axial direction along the curve of the bent glass G. Further the shaft itself may curve in accordance with the curve of the bent glass plate G.

In the example in FIG. 4 and FIG. 5, the glass plates G, G, and . . . are mounted on the conveying unit 150 such that the convex surfaces face upward and the concave surfaces F2 face downward, and therefore, the rotary brush 161 is disposed under the glass plates G, G, and . . . . However, the vertical orientation of the glass plate G and the position of the rotary brush 161 are not limited as long as the concave surface F2 of the glass plate is scratched by the scratching unit 160. Therefore, the bent glass plates G, G, and . . . conveyed after the bend-forming step (S20) is completed may be arranged such that the convex surfaces face downward and the concave surfaces face upward, and the rotary brush 161 may be disposed above the bent glass plates G. However, in the case where the scratching (Sc) is to be performed according to the example illustrated in FIGS. 4 and 5, the glass plates G, G, and . . . , which are bent glass plates having been subjected to the bend-forming step (S20) such as gravity bend forming and conveyed in a downwardly convex state, are turned upside down, that is, the glass plates are turned over.

In the production method according to the first embodiment (FIG. 3), the bent glass plates, after having been subjected to the above-described scratching (Sc), are cleansed with a cleansing liquid (S32) and then dried (S33).

Further, as illustrated in FIG. 3, the glass plates, having completed the cleansing step (S30), are provided to the bonding step (S40). In bonding step (S40), the two glass plates that were stacked and bend formed in the bend-forming step (S20) are combined again, this time, by being laminated via an interlayer film (S41). Thereafter, the laminated glass 1 (FIG. 2) can be obtained by performing preliminary pressure bonding under atmospheric pressure or reduced pressure (S42), and further performing main pressure bonding at a high temperature and under high pressure (S43).

In the case where the scratching tool is equipped with the above-described sheet-shaped flap (rotating flap, non-rotating flap) different from the rotary brush 161, the material of the sheet-shaped flap may be a synthetic resin (examples of which include plastic and foam resin), a natural material, or the like. More specifically, the sheet-shaped flap may be in the form of a resin sheet formed by extrusion molding or the like, or a fiber structure formed by assembling fibers three dimensionally or planarly, and may be felt, cloth (examples of which include woven fabric and knitted fabric), non-woven fabric, paper, or the like. In the case where the sheet is composed of resins or the material of the sheet includes resins, specific examples of the resins include ultra-low density polyethylene, linear low-density polyethylene, low-density polyethylene, high-density polyethylene, polypropylene, polystyrene, polyurethane, silicone resin, ethylene vinyl acetate (EVA), and olefinic elastomer.

At least the portion of the sheet-shaped flap to be brought into contact with the glass plate may be smooth or may be formed with fine irregularities having an arithmetic mean roughness Ra of 0.02 µm or more and 100 µm or less as defined in JIS B 0601:2013. Such fine irregularities may be inherent in the material (such as irregularities formed by the arrangement of the fibers in the fiber structure). In addition, at least the portion of the front surface or the end surface of the sheet-shaped flap to be brought into contact with the glass plate may be subjected to a surface roughening process, may be subjected to the adhering and fixing of fine powder, or may be formed by kneading powder therein during shaping of a material such as a resin.

Production Method According to the Second Embodiment

Figure 6:
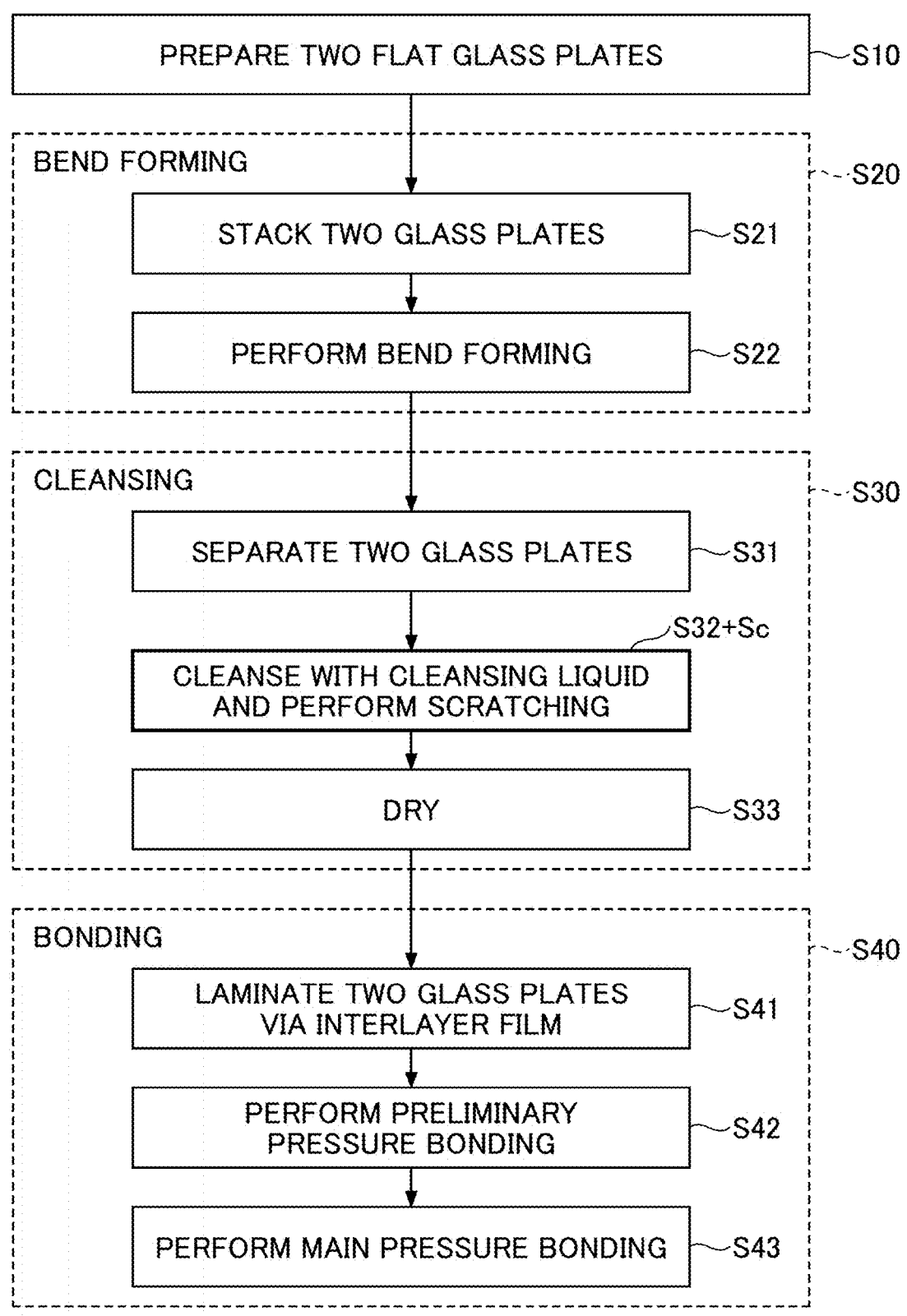
FIG. 6 is a flowchart illustrating an example of a method for producing laminated glass according to a second embodiment of the present disclosure.

FIG. 6 is a flowchart illustrating an example of a method for producing laminated glass for automobile windows according to the second embodiment. The production method according to the second embodiment illustrated in FIG. 6 includes the same steps as those in the production method according to the first embodiment (FIG. 3), namely, the flat glass plates preparing step (S10), the bend-forming step (S20), the cleansing step (S30), and the bonding step (S40). However, as illustrated in FIG. 6, the second embodiment differs from the first embodiment in that the scratching (Sc) is not performed before the cleansing by the cleansing liquid (S32) but rather is performed at the same time as the cleansing by the cleansing liquid (S32). That is the timing of the scratching is different. The other aspects may be substantially the same as those of Embodiment 1. That is, the fundamental steps in the flat glass plates preparing step (S10), the bend-forming step (S20), the cleansing step (S30), and the bonding step (S40) in the second embodiment may be the same as those in the first embodiment.

In the cleansing step (S30), after the two glass plates that were stacked are separated (S31), the two separated glass plates are conveyed to a cleansing device (cleansing unit) in order to perform the cleansing using the cleansing liquid (S32). The cleansing unit is not particularly limited as long as the cleansing unit is configured to remove dirt or the like attached to the surface of the glass plate, by running the cleansing liquid along the surface of the glass plate or by spraying cleansing liquid at the surface of the glass plate.

With the production method according to the second embodiment, scratching can be performed in the cleansing by cleansing liquid (S32) by, for example, mixing an abrasive agent into the cleansing liquid in advance and adjusting the pressure at which the cleansing liquid is sprayed onto the convex surface of the glass plate. According to the aforementioned method in which a cleaning liquid including an abrasive agent is used, it is sufficient to merely include the abrasive agent in the cleansing unit that is conventionally used, and thus it is not necessary to additionally introduce a scratching device into the work flow. Therefore, thus labor and costs associated with the scratching (Sc) can be kept to a minimum which is preferable.

The aforementioned abrasive agent may include inorganic powder, organic powder, or both, when inorganic powder is used, the scratching effect is enhanced and this is preferable. Examples of the inorganic powder include cerium oxide, glass beads, titanium oxide, diamond, calcium carbonate, anhydrous silicic acid, sodium hydrogen phosphate, silicon nitride, silicon carbide, and aluminum oxide. Among them, cerium oxide is preferable from the standpoint of high hardness and enhanced scratching effect owing to the chemical reaction with glass. The above-mentioned powders may be used alone or two or more of these powders may be used in combination. The median diameter (D50) of the powder to be used measured by the method (wet method) described in JIS Z 8825:2013 is preferably 0.1 µm or more and 100 µm or less, more preferably 0.2 µm or more and 30 µm or less, and even more preferably 0.2 µm or more and 15 µm or less. In the case where the particle diameter (median diameter) of the powder is 0.1 µm or more, the polishing effect can be enhanced thereby facilitating the uniformity of the in-plane strength distribution. In the case where the particle diameter is 100 µm or less, an occurrence of scratches that impair the requisite toughness of the glass plate or the obtained laminated glass can be prevented during the scratching process (Sc).

Figure 7:
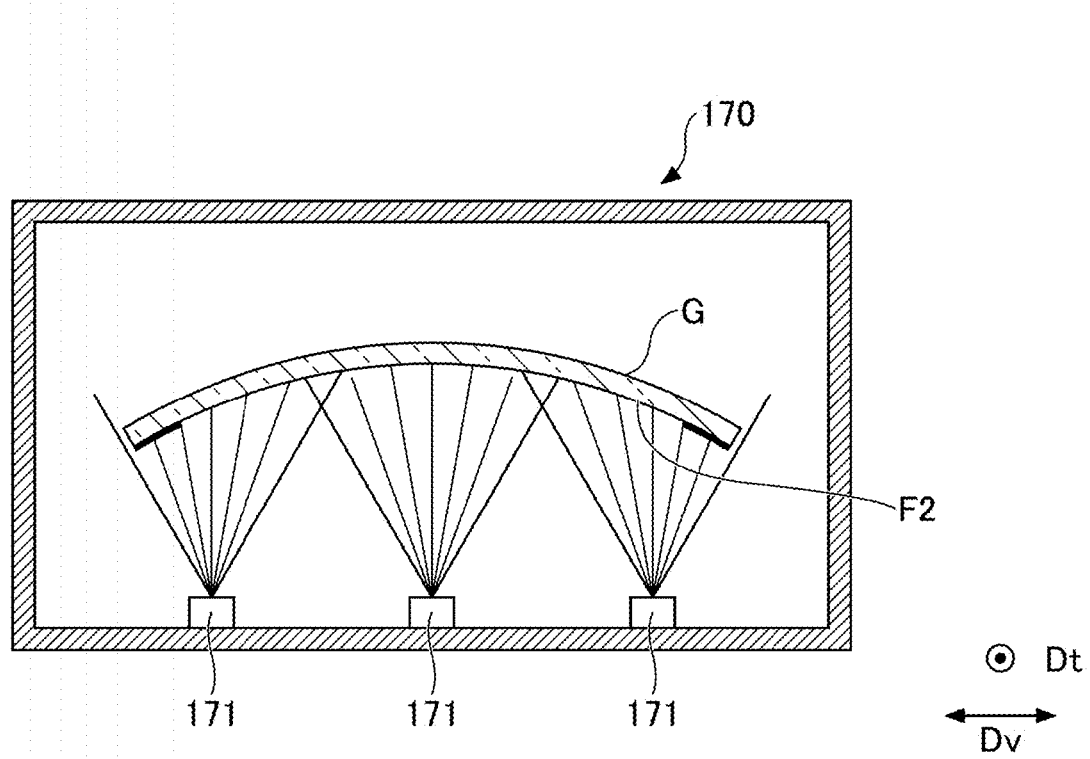
FIG. 7 is a diagram for describing scratching in the second embodiment.

FIG. 7 illustrates a schematic cross-sectional view of a device for performing the scratching (Sc) together with the cleansing by cleansing liquid (S32) and is to be used in the second embodiment. FIG. 7 is a diagram of the cleansing unit 170 taken along the perpendicular direction Dv that is perpendicular to the conveyance direction Dt. The cleansing unit 170 may include a space therein that is closed to some extent so that the cleansing liquid does not splash to the outside of the cleansing unit 170, and may be provided with one or more cleansing liquid spray nozzles 171, 171, and . . . . The cleansing liquid spray nozzles, 171, 171, and . . . can spray out the cleansing liquid containing the aforementioned abrasive agent. The positions of the cleansing liquid spray nozzles, 171, 171, and . . . and the manner in which the cleansing liquid spreads upon being sprayed out can be adjusted such that the entirety of the concave surface F2 of the glass plate G is hit by the cleansing liquid.

The cleansing liquid may refer to a main cleansing liquid containing the cleansing detergent such as a surfactant; a rinsing liquid for removing the cleansing detergent; or both. In this example, the abrasive agent may be included in the main cleansing liquid together with the cleansing detergent. It is, however, preferable that the surface of the bent glass plate is rinsed by a rinsing liquid that does not contain an abrasive agent at the end of the cleansing step.

The present embodiment, the bent glass plate G is conveyed with the convex surface facing upwards (with the concave surface facing downwards) (FIG. 7). This form is preferable in that the cleansing liquid is unlikely to accumulate on the concave surface during the cleansing using the cleansing liquid (S32). When the cleansing liquid accumulates on the concave surface, the abrasive agent in the cleansing liquid tends to adhere to and remain on the surface of the glass plate, and thus it takes time to dry the cleansing liquid, particularly the rinsing liquid. However, according to the present embodiment, the labor and time otherwise spent on removing and drying the remaining abrasive agent is eliminated.

In the second embodiment, instead of including the abrasive agent in the cleansing liquid in advance as described above, the abrasive agent may be sprayed onto or applied to the concave surface F2 of the glass plate G and after doing so, the cleansing liquid may be poured onto the concave surface F2 of the glass plate G or may be sprayed onto the concave surface F2.

Even in the case where the abrasive agent is included in the cleansing liquid as described above and in the case where the cleansing liquid is used after the abrasive agent is applied to the surface of the glass plate, the spraying pressure of the cleansing liquid may be 0.2 Mpa or more and 2 Mpa or less.

In the second embodiment as well, the scratching tool may be used as described in the first embodiment together with the pouring or spraying of the cleansing liquid.

Production Method According to the Third Embodiment

Figure 8:
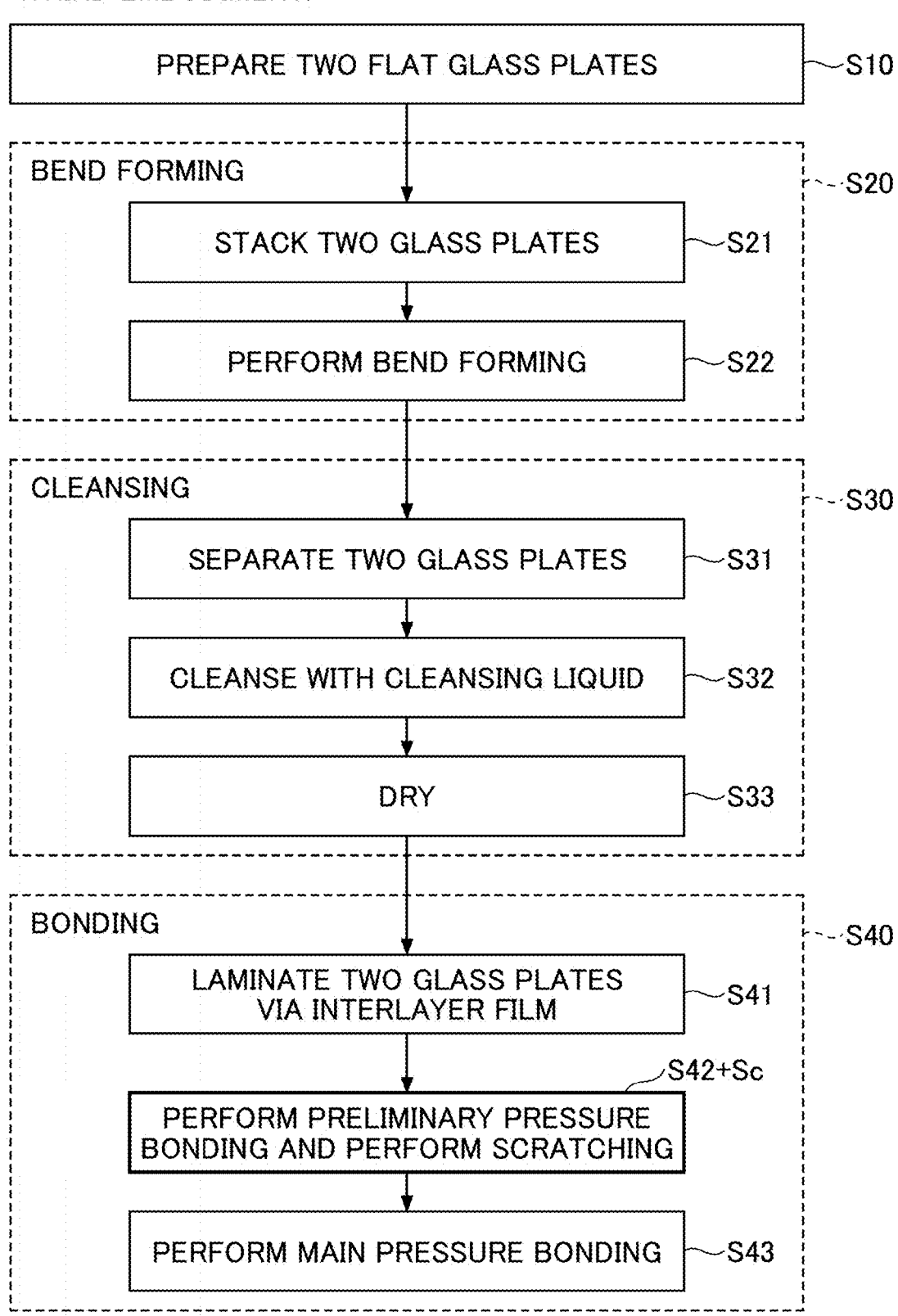
FIG. 8 is a flowchart illustrating an example of a method for producing laminated glass according to a third embodiment of the present disclosure.

FIG. 8 is a flowchart illustrating an example of a method for producing laminated glass for automobile windows according to a third embodiment. The production method according to the third embodiment illustrated in FIG. 8 includes the same steps as those in the production method according to the first embodiment (FIG. 3) and the production method according to the second embodiment (FIG. 6), namely, the flat glass plates preparing step (S10), the bend-forming step (S20), the cleansing step (S30), and the bonding step (S40). However, as illustrated in FIG. 8, the third embodiment differs from the first embodiment and the second embodiment in that the scratching (Sc) is not performed in the cleansing step (S30) but rather is performed in the subsequent bonding step (S40). That is, the timing of the scratching is different. The other aspects may be substantially the same as those of the second embodiment and the third embodiment. That is, the fundamental steps in the flat glass plates preparing step (S10), the bend-forming step (S20), the cleansing step (S30), and the bonding step (S40) in the third embodiment may be the same as those in the first embodiment and the second embodiment.

The bonding step (S40), as described above, includes the laminating of the two glass plates via an interlayer film (S41), and the performing of the preliminary pressure bonding under atmospheric pressure or reduced pressure (S42), and performing of the main pressure bonding at a high temperature and under high pressure (S43). The preliminary pressure bonding (S42) may be a process by which air is removed between the glass plates and the interlayer film before the main pressure bonding (S43) to enhance the adhesion between the plates. In the present embodiment, the preliminary pressure bonding (S42) can be performed by, for example, sandwiching the laminate composed of the two bent glass plates that were laminated via the interlayer film with a pair of nip rollers and then removing any air that may be between the glass plates.

As illustrated in FIG. 8, in the production method according to the third embodiment, the scratching (Sc) can be performed at the same time as the preliminary pressure bonding (S42). Therefore, the scratching (Sc) can be performed without additionally introducing any new equipment into the work flow, and thus the labor and time spent when performing the scratching can be kept to a minimum.

Figure 9:
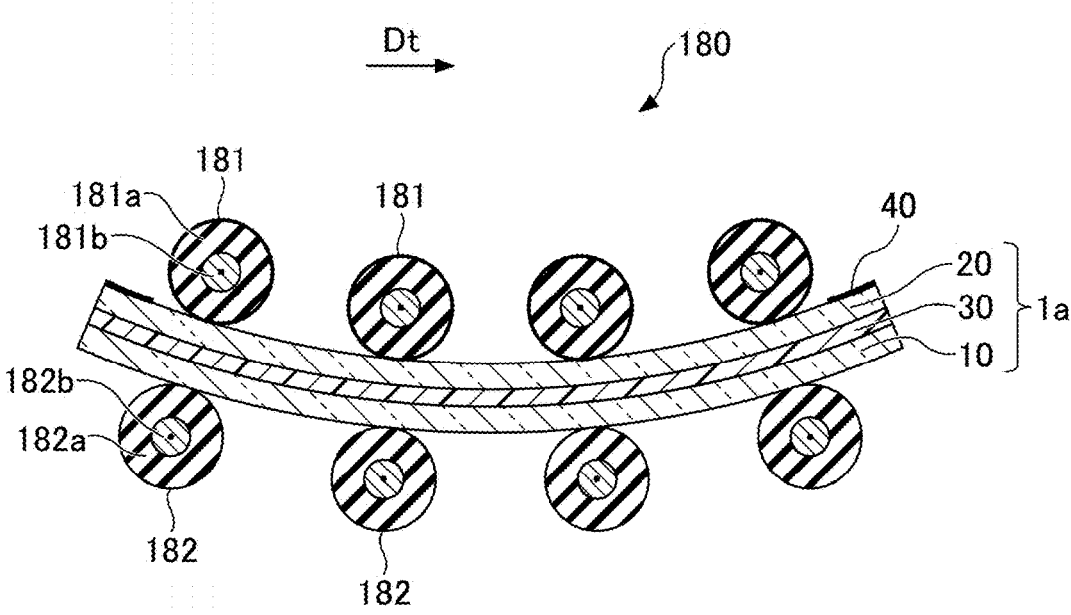
FIG. 9 is a diagram for describing scratching in the third embodiment.

FIG. 9 illustrates an example of a preliminary pressure-bonding unit 180 that utilizes nip rollers. More specifically, FIG. 9 illustrates a state in which a laminate 1a, formed by laminating the vehicle-exterior side glass plate 10 and the vehicle-interior side glass plate 20, which are curved in the bend-forming step (S20), with the interlayer film 30 interposed therebetween, is conveyed in the conveyance direction Dt while being nipped by pairs of nip rollers 181 and 182. The nip rollers may be a single pair or may be formed as multiple pairs in the conveyance direction Dt as illustrated in FIG. 9. Further, the nip pressure by the nip rollers may be 0.2 MPa or more and 0.6 MPa. In the present embodiment, among such pairs of nip rollers 181 and 182, the nip rollers 181 that come into contact with the concave surface (corresponding to the fourth surface 22 in FIG. 2) of the laminate 1a may be imparted with a scratching function.

The nip roller 181 may have, for example, a shaft body 181b and a pressure-bonding body 181a that is mounted around the shaft body 181b, and likewise, the nip roller 182 may have, for example, a shaft body 182b and a pressure-bonding body 182a that is mounted around the shaft body 182b. In the example illustrated in FIG. 9, both of the pressure-bonding bodies 181a and 182a may be formed of an elastic body such as rubber, but fine irregularities may be formed on the surfaces of the pressure-bonding bodies 181a having the scratching function. Such fine irregularities can be formed by roughening the surfaces of the pressure-bonding bodies 181a, adhering and fixing fine powder to the surfaces of the pressure-bonding bodies 181a, or winding sheets having roughened surfaces around the surfaces of the pressure-bonding bodies 181a. The degree of roughness of the obtained rough surface depends on the type of the glass plate to be scratched, the size and shape of the glass plate, and the like, but may be an arithmetic mean roughness of Ra 0.02 μm or more and 100 μm or less as defined in JIS B 0601:2013.

In the example illustrated in FIG. 9, the laminate 1a is conveyed with the convex surface facing downwards, that is, in as state where the concave surface of the laminate 1a is facing upwards. As described in the second embodiment, in the cleansing step (S30), the concave surface of the bent glass plate is faced downwards in order to prevent the cleansing liquid from accumulating. Therefore, in the case where the preliminary pressure bonding (S42) is performed using the arrangement illustrated in FIG. 9, it is preferable to reverse the upward and downward orientation of the bent glass plates or the laminate, that is, turn over the bent glass plates or the laminate, at a timing that comes after completion of the cleansing step (S30) yet before the preliminary pressure bonding (S42). However, the preliminary pressure bonding (S42) may be performed with the concave surface of the laminate 1a facing downwards. In such a case, the nip roller 181 equipped with the scratching function may disposed so as to be underneath the laminate 1a.

Figure 10:
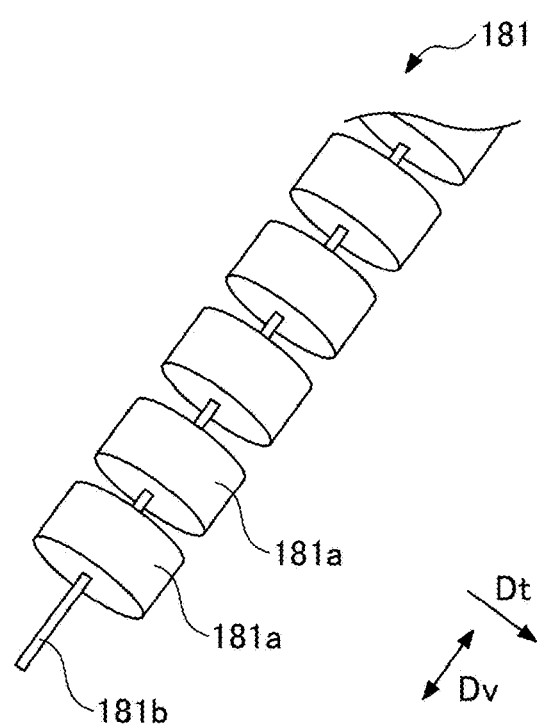
FIG. 10 is perspective view of a nip roller.

Further, although the nip roller 181 may be a roller that comes in contact with the entirety of the laminate 1a, the shaft body 181b may instead have a configuration in which multiple separated pressure-bonding bodies 181a, 181a, and . . . are arranged in the axial direction of the shaft body 181b, as illustrated in FIG. 10. By doing so, the multiple separated pressure-bonding bodies 181a and 181a can move more freely with respect to each other, so that the pressure-bonding bodies can follow the curvature of the laminate 1a in the perpendicular direction Dv.

After the preliminary pressure bonding (S42) is completed, the main pressure bonding (S43) is performed on the laminate 1a. The main pressure bonding (S43) is performed at 0.6 MPa or more and 1.3 MPa or less while heating is performed at 100° C. or more and 150° C. or less, for example. For the main pressure bonding (S43), an autoclave can be used, for example.

The scratching (Sc) performed in the production methods according to the first embodiment to the third embodiment described above are processes for making the in-plane strength of the glass plates more uniform. Therefore, the scratching process (Sc) can be regarded as a process by which the in-plane strength distribution of the flat glass plate or variation in in-plane strength of the flat glass plate is suppressed. In other words, in the case where a distribution of strength values (breaking stress or bending strength) measured in multiple regions in the plane of the glass plate is determined, the scratching can be regarded as a process by which adjustment is performed so that the distribution is narrowed. In addition, in the scratching performed in the production method according to the present embodiment, strength satisfying sufficient toughness as window glass can also be maintained. Therefore, for example, in a case where the surface of the glass plate is divided into multiple regions and the strength of each region is measured to determine the frequency distribution of the strength, a result is obtained in which the distribution region with high strength is shifted to a lower value and the position of the distribution region with low strength does not change much, by the scratching process.

More specifically, in a case where the strength distributions of the concave surface of the glass plate before and after the scratching (Sc) are determined, the scratching can be performed such that the reduction percentage $R_{U20}$ of the average value of the top 20% of the strength distribution of the concave surface of the bent glass plate due to the scratching (Sc) is 10% or more, preferably 20% or more, and the reduction percentage $R_{L10}$ of the average value of the bottom 10% of the strength distribution of the concave surface of the bent glass plate due to the scratching (Sc) is 30% or less, preferably 20% or less.

Here, the reduction percentage $R_{U20}$ (%) is equal to $\{(fb_{U20}-fa_{U20})/fb_{U20}\}\times100$, where the average value of the top 20% of the strength distribution of the concave surface before scratching is denoted by $fb_{U20}$, and the average value of the top 20% of the strength distribution of the concave surface after scratching is denoted by $fa_{U20}$. The reduction percentage RIAA (%) is equal to $\{(fb_{L10}-fa_{L10})/fb_{L10}\}\times100$, where the average value of the bottom 10% of the strength distribution of the concave surface before scratching is denoted by $fb_{L10}$, and the average value of the bottom 10% of the strength distribution of the concave surface after scratching is denoted by $fa_{L10}$. Although the aforementioned method for measuring the strength is not particularly limited as long as the measurement conditions before and after the scratching are the same, the strength can be measured and calculated by the method using R30 according to ISO 1288-5:2016 described further below. In the present embodiment, in order to measure breaking stress of the curved region, the breaking stress value can be determined by deriving an approximate mathematical expression by stress measurement and substituting the measured value into the approximate mathematical expression without using the predetermined mathematical expression described in the ISO mentioned above. Below as well, the measurement and calculation of the breaking stress of the concave surface or the convex surface is calculated using substantially the same method.

As described above, the scratching process (Sc) in the present embodiment can be performed such that the average value of the top 20% or more of the strength distribution is significantly reduced, that is, the region where the strength is excessively high is reduced; and the average value of the bottom 10% or less of the strength distribution, that is, the region where the strength is low is not excessively low or such a region is not excessively increased.

Further, in a case where the strength distributions of the concave surface before and after the scratching (Sc) are determined, the scratching can be performed such that the difference $(fb_{U20}-fa_{U20})$ between the average $(fb_{U20})$ of the top 20% of the strength distribution of the concave surface before the scratching and the average $(fa_{U20})$ of the top 20% of the strength distribution of the concave surface after the scratching is 50 MPa or more, preferably 70 MPa or more, and the difference $(fb_{L10}-fa_{L10})$ between the average $(fb_{L10})$ of bottom 10% of the strength distribution of the concave surface before the scratching and the average ($fa_{L10}$) of the bottom 10% of the strength distribution of the concave surface after the scratching is 30 MPa or less, preferably 20 MPa or less.

Further, in the case where the strength distribution is determined for each of the concave surface of the scratched glass plate and non-scratched convex surface on the opposite thereof, the glass plate can be scratched such that the difference ($fx_{U20}-fv_{U20}$) between the average ($fx_{U20}$) of the top 20% of the strength distribution of the convex surface and the average ($fv_{U20}$) of the top 20% of the strength distribution of the concave surface is 50 MPa or more, preferably 70 MPa or more, and the difference ($fx_{L10}-fv_{L10}$) between the average ($fx_{L10}$) of the bottom 10% of the strength distribution of the convex surface and the average ($fv_{L10}$) of the bottom 10% of the strength distribution of the concave surface is 30 MPa or less, preferably 20 MPa or less.

In the method according to ISO 1288-5:2016, a glass plate to be tested is placed on a support ring having a predetermined diameter, a load is gradually increased from above the glass plate by a load ring having a predetermined diameter that is smaller than the support ring, and a load at the time of breakage is measured. The load is applied from the side opposite to the surface for which the strength is to be determined. Then, from the obtained measured values, the breaking stress value is determined based on a predetermined mathematical expression described in ISO 1288-5:2016. Here, in order to determine the in-plane strength distribution, the glass plate is cut out into a predetermined size and divided. Thus, the breaking stress can be measured for each divided region. At this time, the size of the glass after the dividing (after cutting) is not particularly limited, and may be 60 mm to 300 mm×60 mm to 300 mm. The number of divided samples for determining the strength distribution may be preferably 30 or more, and more preferably 50 or more. In the above-described measurement and calculation, the breaking stress value can be determined by deriving an approximate mathematical expression by stress measurement and substituting the measured value into the approximate mathematical expression without using the predetermined mathematical expression described in the ISO mentioned above.

<Laminated Glass for Automobile Windows>

In other embodiments of the present disclosure, laminated glass may be obtained by the aforementioned production method. More specifically, the laminated glass for automobile windows is obtained by bonding together the vehicle-exterior side glass plate 10 and the vehicle-interior side glass plate 20 via the interlayer film 30. In this case, where the vehicle-exterior side surface of the vehicle-exterior side glass plate 10 is the first surface 11 and the vehicle-interior side surface of the vehicle-exterior side glass plate 10 is the second surface 12, and the vehicle-exterior side surface of the vehicle-interior side glass plate 20 is the third surface 21 and the vehicle-interior side surface of the vehicle-interior side glass plate 20 is the fourth surface 22 (FIG. 2), one or more of the following Condition 1 to Condition 3 may be satisfied.

Condition 1: The difference ($S1_{U20}-S4_{U20}$) between the average value ($S1_{U20}$) of the top 20% of the strength distribution of the first surface 11 and the average value ($S4_{U20}$) of the top 20% of the strength distribution of the fourth surface 22 is 50 MPa or more, preferably 70 MPa or more, and the difference ($S1_{L10}-S4_{L10}$) between the average value ($S1_{L10}$) of the bottom 10% of the strength distribution of the first surface 11 and the average value ($S4_{L10}$) of the bottom 10% of the strength distribution of the fourth surface 22 is 50 MPa or less, preferably 30 MPa or less.

Condition 2: The difference ($S1_{U20}-S2_{U20}$) between the average value ($S1_{U20}$) of the top 20% of the strength distribution of the first surface 11 and the average value ($S2_{U20}$) of the top 20% of the strength distribution of the second surface 12 is 50 MPa or more, preferably 70 MPa or more, and the difference ($S1_{L10}-S2_{L10}$) between the average value ($S1_{L10}$) of the bottom 10% of the strength distribution of the first surface 11 and the average value ($S2_{L10}$) of the bottom 10% of the strength distribution of the second surface 12 is 50 MPa or less, preferably 30 MPa or less.

Condition 3: The difference ($S3_{U20}-S4_{U20}$) between the average value ($S3_{U20}$) of the top 20% of the strength distribution of the third surface 21 and the average value ($S4_{U20}$) of the top 20% of the strength distribution of the fourth surface 22 is 50 MPa or more, preferably 70 MPa or more, and the difference ($S3_{L10}-S4_{L10}$) between the average value ($S3_{L10}$) of the bottom 10% of the strength distribution of the third surface 21 and the average value ($S4_{L10}$) of the bottom 10% of the strength distribution of the fourth surface 22 is 50 MPa or less, preferably 30 MPa or less.

The strengths of the above-described Condition 1 to Condition 3 may be breaking stresses measured by method in accordance with ISO 1288-5:2016 by applying a load from a surface opposite to a surface for which a strength distribution is to be determined. In the case where the strength of the second surface 12 on the vehicle-interior side of the vehicle-exterior side glass plate 10 and the strength of the fourth surface 22 of the vehicle-interior side glass plate 20 are to be measured, the respective strengths can be measured after the vehicle-exterior side glass plate 10 and the vehicle-interior side glass plate 20 are separated from the laminated glass and the interlayer film 30 is removed. Among the measurements performed under the above Condition 1 to Condition 3, when the value under the Condition 1 is to be determined, the strength can be measured without the need to break the configuration of the laminated glass.

When one or more of Condition 1 to Condition 3 is satisfied, laminated glass in which both a region having excessively high strength and a region having excessively low strength are reduced or eliminated in at least one of the second surface 12 or the fourth surface 22, that is, laminated glass having uniform in-plane strength and sufficient strength as window glass can be obtained. Therefore, according to the present embodiment, laminated glass for automobile windows capable of ensuring bodily protection performance for a pedestrian or the like even when the pedestrian or the like collides with the laminated glass from the outside of the vehicle and having sufficient toughness as an automobile window glass since the laminated glass can appropriately break and absorb the impact when the laminated glass sustains the impact from the outside of the vehicle, can be provided.

Preferably, at least Condition 2 of the aforementioned Condition 1 to Condition 3 is satisfied. When Condition 2 is satisfied, the in-plane strength of the second surface 12 that is most likely to be affected when the laminated glass sustains an impact from the outside of the vehicle, is made uniform, and a region having excessively high strength is reduced or eliminated. Therefore, the laminated glass can be appropriately broken to enhance the effect of absorbing the impact, and thus the performance of protecting the body of a pedestrian or the like at the time of collision of the pedestrian or the like can be further improved.

In addition, the laminated glass for automobile windows according to the present embodiment may be the automobile window laminated glass 1 (FIG. 2) obtained by bonding together the vehicle-exterior side glass plate 10 and the vehicle-interior side glass plate 20 via the interlayer film 30. In this case, the average value of the top 20% of the breaking stress distribution of a transmittance region measured by a method in accordance with ISO 1288-5:2016 by applying a load from the vehicle-exterior side may be 500 MPa or less, preferably 450 MPa or less. In the present specification, the transmittance region refers to a portion of the laminated glass for automobile windows excluding the shielding layer formed on the laminated glass for automobile windows.

Although the present invention has been described based on the specific embodiments, the present invention is not limited to the above embodiments. In addition, individual configurations included in the above-described embodiments can be combined.

What is claimed is:

1. A method for producing laminated glass for automobile windows, the method comprising:

heating and bend forming two glass plates; and bonding together the two bend-formed glass plates via an interlayer film, wherein the method further comprises scratching that is performed on a concave surface of at least one of the two glass plates, after the bend-forming, wherein the bonding includes:

obtaining a preliminary pressure-bonded body by performing preliminary pressure bonding on a laminate in which the two glass plates are laminated via the interlayer film under atmospheric pressure or reduced pressure, and obtaining laminated glass by performing main pressure bonding on the preliminary pressure-bonded body at a high temperature and under high pressure, and wherein the scratching is performed on a concave surface of the laminate together with the preliminary pressure-bonding.

2. The method for producing laminated glass for automobile windows according to claim 1, wherein the scratching is performed by bringing a scratching tool into contact with the concave surface of the at least one glass plate and moving the scratching tool relatively to the concave surface.

3. The method for producing laminated glass for automobile windows according to claim 1, further comprising:

cleansing the two bend-formed glass plates, the cleansing being performed at a timing that is after the bend-forming and before the bonding, wherein the scratching is performed before the bonding.

4. The method for producing laminated glass for automobile windows according to claim 1, further comprising:

cleansing the two bend-formed glass plates, the cleansing being performed at a timing that is after the bend-forming and before the bonding, wherein the scratching is performed together with the cleansing.

5. The method for producing laminated glass for automobile windows according to claim 4, wherein the scratching is performed by spraying out a cleansing liquid containing an abrasive agent.

6. The method for producing laminated glass for automobile windows according to claim 4, wherein the scratching is performed by applying an abrasive agent to the concave surface of the at least one glass plate and thereafter cleansing the concave surface with a cleansing liquid.

7. The method for producing laminated glass for automobile windows according to claim 4, wherein in the cleansing, the concave surface of the at least one glass plate is facing downwards.

8. The method for producing laminated glass for automobile windows according to claim 1, wherein the scratching is performed on the concave surface of each of the two glass plates.

9. The method for producing laminated glass for automobile windows, according to claim 1, wherein the preliminary pressure bonding is performed by sandwiching the laminate between a plurality of rollers, and a surface of the rollers that are facing the concave surface of the laminate is a roughened surface.

* * * * *